United States Patent
Chrysanthos

(10) Patent No.: US 9,478,077 B2
(45) Date of Patent: Oct. 25, 2016

(54) METHOD OF ANALYSING FLIGHT DATA

(71) Applicants: SAGEM DEFENSE SECURITE, Paris (FR); UNIVERSITE DE TECHNOLOGIE DE TROYES, Troyes (FR)

(72) Inventor: Nicolas Chrysanthos, Paris (FR)

(73) Assignees: SAGEM DEFENSE SECURITE, Boulogne-Billancourt (FR); UNIVERSITE DE TECHNOLOGIE DE TROYES, Troyes (FR)

( * ) Notice: Subject to any disclaimer, the term of this patent is extended or adjusted under 35 U.S.C. 154(b) by 0 days.

(21) Appl. No.: 14/381,207

(22) PCT Filed: Feb. 26, 2013

(86) PCT No.: PCT/EP2013/053798
§ 371 (c)(1),
(2) Date: Aug. 26, 2014

(87) PCT Pub. No.: WO2013/127781
PCT Pub. Date: Sep. 6, 2013

(65) Prior Publication Data
US 2015/0019070 A1    Jan. 15, 2015

Related U.S. Application Data

(60) Provisional application No. 61/617,601, filed on Mar. 29, 2012.

(30) Foreign Application Priority Data

Feb. 29, 2012  (FR) ...................... 12 51870

(51) Int. Cl.
*G07C 5/02*  (2006.01)
*G05B 23/02*  (2006.01)
(Continued)

(52) U.S. Cl.
CPC  *G07C 5/02* (2013.01); *G01D 9/00* (2013.01); *G05B 23/024* (2013.01); *G05B 23/0227* (2013.01); *G07C 5/08* (2013.01); *B64D 2045/0065* (2013.01)

(58) Field of Classification Search
CPC ............ G07C 5/02; G07C 5/08; G01D 9/00; B64D 43/00; G01C 21/005; G01C 23/005; G01M 15/14; G01S 13/86; G01S 13/913; G01S 17/89; G01S 7/412; G05B 23/0254; G06F 15/7867
USPC ............ 701/3; 702/55, 150; 705/38; 342/33; 375/240.33, 295; 382/132; 455/466; 600/410
See application file for complete search history.

(56) References Cited

U.S. PATENT DOCUMENTS 5,136,297 A * 8/1992 Lux ...................... G01C 21/005
                                                        342/33
6,937,924 B1   8/2005 Statler et al.
(Continued)

FOREIGN PATENT DOCUMENTS

EP    2 354 876 A2    8/2011

*Primary Examiner* — Behrang Badii
*Assistant Examiner* — Sanjeev Malhotra
(74) *Attorney, Agent, or Firm* — Blakely Sokoloff Taylor & Zafman LLP

(57) ABSTRACT

The invention relates to a method of analyzing flight data recorded during N flights of at least one aircraft, by means of a flight data recorder of an aircraft, the data being grouped together by flight i in a signature vector of the flight $X_i$ of size d, the components of which correspond to data recorded during said flight i of the aircraft, a flight i being thus defined by the signature vector $X_i$, the method comprising the following steps: Gaussian kernel entropy component analysis of the flight signatures $X_i$ to obtain a zone of normal flights and classifying the flight signatures $X_i$ with respect to their distance to said zone; determining, for each flight i, an abnormality score $z_i$ defined by the distance of a flight signature $X_i$ with respect to the zone of normal flights; detecting, as a function of the abnormality score $z_i$, at least one abnormal flight.

9 Claims, 2 Drawing Sheets

(51) Int. Cl.
*G01D 9/00* (2006.01)
*G07C 5/08* (2006.01)
*B64D 45/00* (2006.01)

(56) References Cited

U.S. PATENT DOCUMENTS

| | | | | |
|---|---|---|---|---|
| 2004/0059472 | A1* | 3/2004 | Hedrick | G01C 23/005 701/3 |
| 2007/0192241 | A1* | 8/2007 | Metlapalli | G06F 15/7867 705/38 |
| 2008/0008260 | A1* | 1/2008 | Hoshino | H04B 7/0408 375/295 |
| 2008/0091630 | A1 | 4/2008 | Bonissone et al. | |
| 2011/0274334 | A1* | 11/2011 | Zhu | G06T 7/204 382/132 |
| 2011/0276307 | A1* | 11/2011 | Taguchi | B25J 9/1694 702/150 |
| 2013/0095864 | A1* | 4/2013 | Marovets | H04W 4/14 455/466 |
| 2013/0179097 | A1* | 7/2013 | Masse | G01M 15/14 702/55 |
| 2013/0204115 | A1* | 8/2013 | Dam | G06T 7/0012 600/410 |
| 2013/0223523 | A1* | 8/2013 | Moghadam | H04N 19/172 375/240.03 |

* cited by examiner

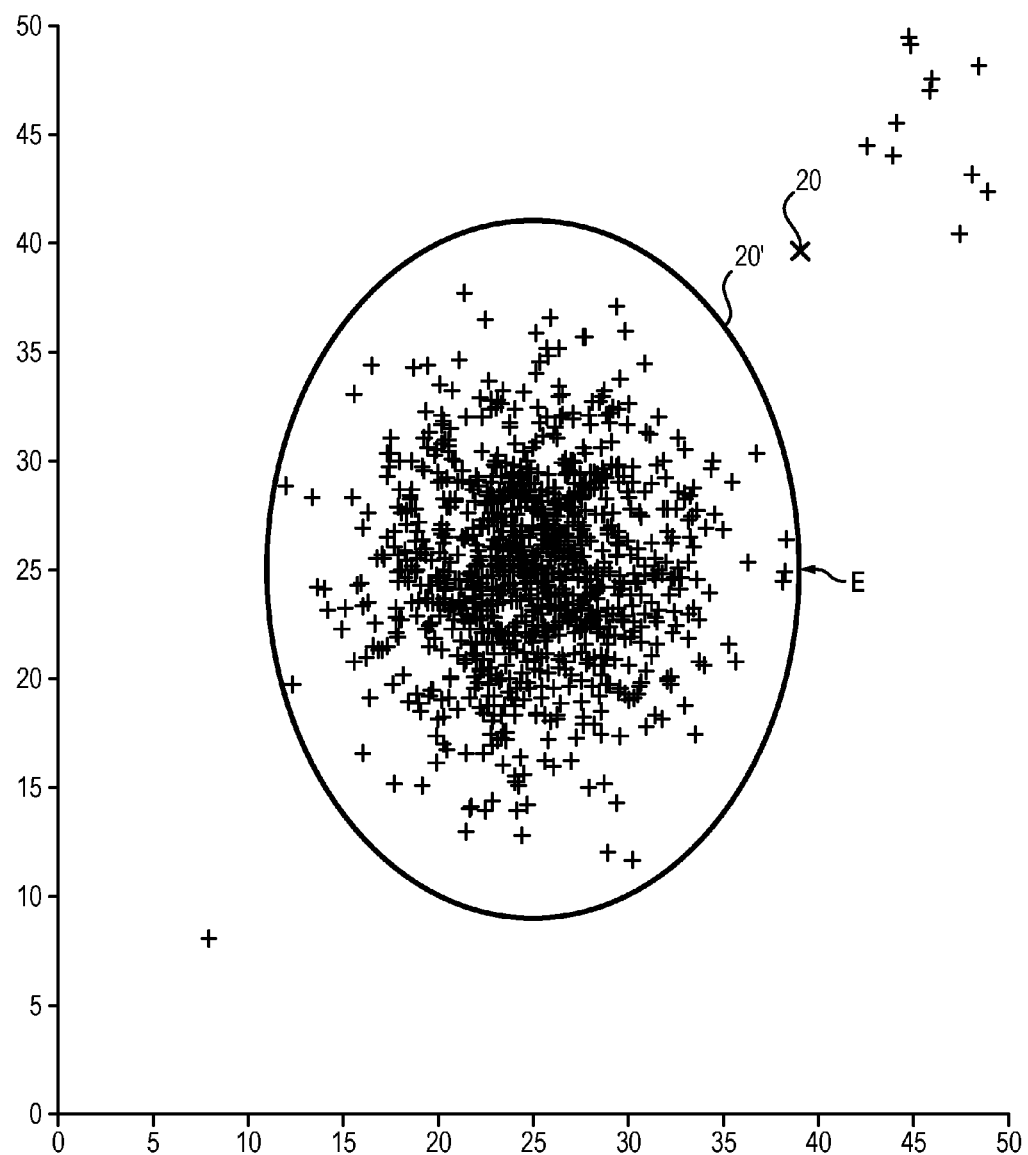

METHOD OF ANALYSING FLIGHT DATA

GENERAL TECHNICAL FIELD

The invention relates to a method of analysing a set of flight data recorded during at least one flight of at least one aircraft.

PRIOR ART

The regulations in terms of maintenance and air traffic define standards that airline companies are required to comply with in order to ensure to a user a maximum level of safety.

In order to optimise the maintenance phases, airline companies have equipped themselves with flight data analysis systems.

Flight data analysis systems known by the name FDM (Flight Data Monitoring) or instead FOQA (Flight Operational Quality Assurance) are known. These systems consist in equipping an aircraft with a flight data recorder. Such a recorder is for example a black box or instead a specific recorder such as an ACMS (Aircraft Condition Monitoring System).

These systems enable airline companies to understand in detail the course of a flight from regular recordings of the values of these flight data made during each flight of each of their airplanes.

To do this, these systems detect predefined events occurring during the flight and an expert then analyses these events, which indicate that a technical incident has occurred during the flight, that a practice or a condition provided by a flight procedure has not been complied with, thus giving warning at a very advanced stage of any incidents or accidents that could arise.

These techniques necessitate predefining rules for detecting events, usually defined as exceeding thresholds of one or more parameters, which may trigger alerts so that the expert analyses more closely the flight.

A problem is that these techniques do not make it possible to detect singular events beyond the predefined rules, which may lead to a non detection of an abnormal flight.

DESCRIPTION OF THE INVENTION

An aim of the invention is to make it possible to detect abnormal flights without having the need to define detection rules.

To this end, the invention proposes a method of analysing flight data recorded during N flights of at least one aircraft, the data being grouped together by flight i in a signature vector of the flight $X_i$ of size d, the components of which correspond to data recorded during said flight i of the aircraft, a flight i being thus defined by the signature vector $X_i$, the method comprising the following steps:
- Gaussian kernel entropy component analysis of the flight signatures $X_i$ to obtain a zone of normal flights and classifying the flight signatures $X_i$ with respect to their distance to said zone;
- determining, for each flight i, an abnormality score $z_i$ defined by the distance of a flight signature $X_i$ with respect to the zone of normal flights;
- detecting, as a function of the abnormality score $z_i$, at least one abnormal flight.

The invention is advantageously completed by the following characteristics, taken singly or in any technically possible combination thereof:

- for each abnormal flight detected, a phantom flight the nearest to the abnormal flight detected is determined while being in the zone of normal flights.
- the parameters of the abnormal flight detected are compared with those of the phantom flight determined in order to detect at least one parameter of the abnormal flight that has rendered abnormal said abnormal flight detected.
- the Gaussian entropy component analysis comprises the following sub-steps:
  - determination of a matrix of similarity K of size N×N, the components of which quantify the proximity between two flight signatures $X_i$;
  - breakdown into eigen vectors of the matrix of similarity K to obtain N eigen vectors $a_1, \ldots, a_N$ and N eigen values $\lambda_1, \ldots, \lambda_N$ such that $\forall i=1, \ldots, N$ $K \cdot a_i = \lambda_i \cdot a_i$;
  - determination, for each eigen vector, of its entropy coefficient $\gamma$,
  - selection of a sub-assembly of eigen vectors $\{a_m\}_{m=\{1, \ldots, N\}}$ such that the sum of the entropies $\gamma_m$ is greater than the percentage of the sum of the N entropies $\gamma_i$.
- the entropy coefficient is defined by $$\forall i = 1, \ldots, N$$

$$\gamma_i = \frac{\lambda_i \cdot \left(\sum_{j=1}^{N} a_{i,j}\right)}{N^2}.$$

- the abnormality score of a flight i is defined by:

$$z_i = 1 - \sum_{k \in m} \frac{(K_i^T a_k)^2}{\lambda_k}.$$

- the components of the matrix of similarity K are defined by:

$$\forall i = 1, \ldots, N$$

$$K_{i,j} = \exp\left(-\frac{\|X_i - X_j\|^2}{2\sigma^2}\right),$$

where $\sigma^2$ is a predetermined bandwidth parameter.
- the bandwidth parameter $\sigma^2$ is determined in the following manner:
  - a matrix D of size N×N is determined corresponding to the distance between two flights and is defined in the following manner $\forall i=1, \ldots, N$ $D_{i,j} = \|X_i - X_j\|^2$;
  - each component of each column is arranged in ascending order to obtain a matrix D';
  - k first lines of the matrix D' thereby obtained are selected and the others are eliminated to obtain a matrix D' of size k×N;
  - the average of each column of the matrix D' is determined to obtain N values $y_1, \ldots, y_N$;
  - the median absolute deviation of the values $y_1, \ldots, y_N$ defined by mad=mediane{$|y_i-\text{med}|$} with med=mediane{y1, \ldots, $y_N$} is determined;
  - the bandwidth parameter $\sigma^2$ is determined from the median absolute deviation of the values $y_1, \ldots, y_N$ by the following functional $$\sigma^2 = \max_{y_i < med + 20 \cdot mad} \{y_i\}.$$

the data of a flight i are grouped together in a matrix $F_i$ of dimension T×P with T the number of data recorded during the flight i and P the number of parameters recorded, the vector $X_i$ having for components the columns of the matrix $F_i$ end to end, the vector $X_i$ being then of dimension d=T×P and is defined by $X_i=[F_i(t=1,p=1), \ldots, F_i(t=T,p=1), \ldots, F_i(t=1, p=P), \ldots, F_i(t=T,p=P)$.

the data of a flight i are grouped together in a matrix $F_i$ of dimension T×P with T the number of data recorded during the flight i and P the number of parameters recorded, the vector $X_i$ having for components the columns of the matrix $F_i$ sampled to select n<T recordings $t_1^i, \ldots, t_n^i$, of parameters, the vector $X_i$ being then of dimension d=n×P and is defined by $X_i=[F_i(t=t_1^i,p=1), \ldots, F_i(t=t_n^i,p=1), \ldots, F_i(t=t_1^i, p=P), \ldots, F_i(t=t_n^i,p=P)$)

the data of a flight i are grouped together in a matrix $F_i$ of dimension T×P with T the number of data recorded during the flight i and P the number of parameters recorded, the vector $X_i$ having for components the average, the variance, the minimal value, the maximal value of a parameter among all the recordings of this parameter, the vector $X_i$ being then defined by:

$$X_i = \begin{bmatrix} \text{mean}(F_i(p=1)), \text{var}(F_i(p=1)), \max(F_i(p=1)), \max(F_i(p=1)), \\ \vdots \\ \text{mean}(F_i(p=P)), \text{var}(F_i(p=P)), \max(F_i(p=P)), \max(F_i(p=P)) \end{bmatrix}.$$

The invention has numerous advantages.

With the invention, the detection of abnormal flights is automatic and does not necessitate the intervention of an expert for said detection.

With the invention the detection is implemented in a statistical manner while taking into account parameters. In this way, there is an automatic learning that takes place.

The invention enables unexpected problems to be highlighted.

The invention enables problems stemming from the contribution of several parameters to be detected.

The method of the invention may be used by a non expert in statistics or data mining.

Moreover, with the invention, the diagnosis of abnormal flights is simple because it makes it possible to create a reference flight, the phantom flight for each abnormal flight detected.

DESCRIPTION OF FIGURES

Other characteristics, aims and advantages of the invention will become clearer from the description that follows, which is purely illustrative and non limiting, and which should be read with reference to the appended drawings, in which:

FIG. 2 illustrates a representation of flight data according to an embodiment of the invention.

In all of the figures, similar elements have identical numerical references.

DETAILED DESCRIPTION OF THE INVENTION

Figure 1A:
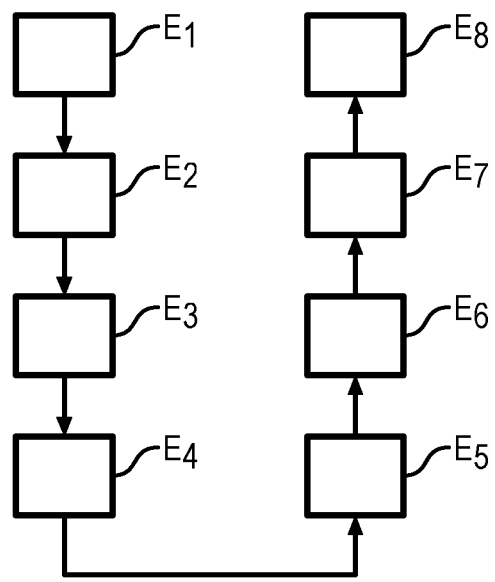
FIGS. 1a and 1b schematically illustrate steps of a method according to an embodiment of the invention.
Figure 1B:
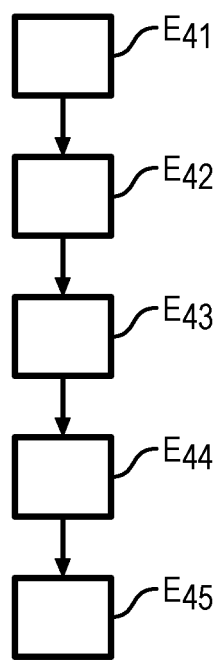

In a method of analysing flight data in a preliminary step (not detailed) flight data recorded during several flights made by at least one aircraft are recovered.

These flight data correspond to flight parameters such as for example the speed, the altitude, the temperature, etc.

Then, in a first step E1, it is advisable to extract for each flight i, among all the data recorded during the flight i, those that characterise the flight i in other words the signature of each flight i.

For N≥1 flights, there are a number $P_0$ of parameters recorded over a flight time $T_0$. By way of example, in certain recorders, it is possible to have up to $P_0$=2000 parameters.

It is considered that the parameters are recorded/sampled at the same frequency, if necessary, well known techniques of oversampling and linear approximation are implemented on the data.

To extract E1 the data characteristic of a flight i, according to one embodiment, a restriction is made to a flight phase (for example, the landing) of time T<$T_0$ and only a restricted number P<$P_0$ of pertinent parameters are retained for the analysis of the data of this flight i. By way of example, it is possible to make a restriction to T=1000 seconds and P=30 parameters.

Hereafter, the value of each data of the flight i is designated in the following manner: $F_i$(t=5,p=1) in other words the value of the first parameter recorded at the $5^{th}$ second (if the data are sampled in seconds) for the flight i.

Then, after the extraction E1, in a signature vector $X_i$ of a flight i of dimension d, the data is grouped together E2.

Each signature vector $X_i$ thus contains the set of pertinent information relative to the flight i.

The grouping together E2 may be implemented according to three embodiments.

According to a first embodiment, the grouping together E2 in the vector consists in keeping all of the data. This is then known as an exhaustive approach.

According to this first embodiment, to obtain a vector $X_i$ it is advisable to take the matrix $F_i$ and to stick columns one to one.

The vector $X_i$ is then of dimension d=T×P and is defined by:

$X_i=[F_i(t=1,p=1), \ldots, F_i(t=T,p=1), \ldots, F_i(t=1, p=P), \ldots, F_i(t=T,p=P)$).

For example if T=1000 and P=30 then there is a vector $X_i$ of size 30000 (and not a matrix of size 1000×30).

The grouping together according to this first embodiment is useful when one has little extensive job knowledge, and makes it possible to spot quite easily any flight path deviation.

According to a second embodiment, the grouping together E2 in the vector $X_i$ consists in focusing on the value of the parameters at precise instants, which are known as snapshots. These precise instants have an operational sense, for example for the landing phase a snapshot may be made every 1000 feet from 10000 feet of altitude, or then snapshots may be made at instants where particular events take place: landing gear down, etc.

In assuming that n instants of snapshots have been defined then for a flight i the instants of snapshots $t_1^i, \ldots, t_n^i$ are noted. It should be noted these instants do not necessarily take place at the same moment for each flight.

The vector $X_i$ is then of dimension $d=n \times P$ and is defined by $$X_i = [F_i(t=t_1^i, p=1), \ldots, F_i(t=t_n^i, p=1), \ldots, F_i(t=t_1^i, p=P), \ldots, F_i(t=t_n^i, p=P)].$$

This second embodiment makes it possible to obtain better results than with the first embodiment. Indeed, in this second embodiment, since T>>n there is much less data to process than in the first embodiment.

According to a third embodiment, the grouping together E2 in the vector $X_i$ consists in "summarising" each "curve" of each parameter in a small set of $k \approx 5$ or 10 values: these k values may for example be the average, the variance, the max. value, the min. value of each parameter recorded.

These k values are then combined for all of the parameters to obtain the signature vector $X_i$ of dimension $d = k \times P$ for $k \approx 4$ is defined by $$X_i = \begin{bmatrix} \text{mean}(F_i(p=1)), \text{var}(F_i(p=1)), \max(F_i(p=1)), \max(F_i(p=1)), \\ \vdots \\ \text{mean}(F_i(p=P)), \text{var}(F_i(p=P)), \max(F_i(p=P)), \max(F_i(p=P)) \end{bmatrix}.$$

If for example there are P=30 parameters, one then has a signature vector $X_i$ of size d=120.

At the end of the grouping together step E2, there are available $N \geq 1$ signature vectors $X_i$ of size d, the components of which correspond to pertinent data recorded during said flight i of the aircraft.

In a complementary manner, each of the components of each signature vector $X_i$ may be normalised E3.

Such a normalisation proves useful when the components of each signature vector $X_i$ have varied orders of magnitude.

In a preferred manner, the normalisation E3 leads to having components of zero average and standard deviation 1 on the set of all of the flights.

$X_i$ is hereafter employed to designate the signature vector of a flight i, the components of which are normalised or not.

The signature vectors $X_i$ are going to undergo several treatments to make it possible to identify if a flight is abnormal.

To do this, a Gaussian kernel entropy component analysis E4 of the signature vectors $X_i$ is going to be implemented to obtain a zone of normal flights E and classifying the signature vectors $X_i$ with respect to their distance to said zone.

In other words, it involves, from all of the flight signatures $X_i$ grouping them together in order to demarcate a zone E of normal flights.

Such an analysis E4 is for example described in the document R. Jenssen: "*Kernel entropy component analysis*", IEEE transactions on pattern analysis and machine intelligence, vol. 32, no 5, pages 847-860, May 2010.

To carry out the analysis, a matrix of similarity K is determined E41 of size $N \times N$, the components of which quantify the proximity between two signature vectors $X_i$ (in other words between two flights).

This matrix K is known by the name Gram matrix.

The matrix K is obtained from a matrix of the distances D to which a Gaussian function with a predetermined bandwidth parameter $\sigma^2$ is applied (the determination of this parameter will be described later).

The matrix K has for expression $$\forall i = 1, \ldots, N$$

$$K_{i,j} = \exp\left(-\frac{\|X_i - X_j\|^2}{2\sigma^2}\right).$$

The bandwidth parameter is obtained by calculation of the distances of each signature vector $X_i$ to its k nearest neighbours with k a whole number between 4 and 10. The value of k depends on the number of flights N and the dimension d.

To determine E42 the bandwidth parameter $\sigma^2$, a matrix D is determined of size $N \times N$ corresponding to the distance between two flights and which is defined in the following manner $\forall i=1, \ldots, N$ $D_{i,j} = \|X_i - X_j\|^2$.

Next, for each of the columns of the matrix D, its elements are arranged in ascending order to obtain a matrix D' such that $\forall j=1, \ldots, N$ $D_{1j}' < \ldots < D_{Nj}'$.

Next, the k first lines of the matrix D' thereby obtained are selected and the others are eliminated to obtain a matrix D' of size $k \times N$.

Then, the average of each column of the matrix D' is determined to obtain N values $y_1, \ldots, y_N$ which represent in fact the average distance of each vector to its k nearest neighbours.

Next, the values $y_1, \ldots, y_N$ that are aberrant are eliminated. To do this, one begins by determining med the median value of the set $y_1, \ldots, y_N$, which is written med=median{y1, ..., yN}. Next the absolute median deviation of the values $y_1, \ldots, y_N$ defined as being the median value of the set $\{|y1-\text{med}|, \ldots |yN-\text{med}|\}$ which is written mad=mediane$\{|y_i - \text{med}|\}$ is determined.

Then, the bandwidth parameter $\sigma^2$ is determined from the median absolute deviation of the values $y_1, \ldots, y_N$ by the following functional $$\sigma^2 = \max_{y_i < \text{med} + 20 \cdot \text{mad}} \{y_i\}.$$

In other words, all of the values $y_i$ that are greater than med+20·mad have been eliminated and the largest of the remaining values is chosen as bandwidth parameter.

Once the matrix K is obtained, the matrix of similarity K is broken down E43 into eigen vectors to obtain N eigen vectors $a_1, \ldots, a_N$ and N eigen values $\lambda_1, \ldots, \lambda_N$ such that $\forall i=1, \ldots, N$ $K \cdot a_i = \lambda_i \cdot a_i$.

It should be noted that each of the eigen vectors $a_i$ is of size N: $a_i \in \mathbb{R}^N$ and $a_{i,j}$ designates the $j^{th}$ component of the vector $a_i$. The $\lambda_i$ are also called the energy coefficients.

From the vectors and eigen values obtained one determines E44 for each eigen vector its entropy coefficient $\gamma_i$ defined by $$\forall i = 1, \ldots, N$$

$$\gamma_i = \frac{\lambda_i \cdot \left(\sum_{j=1}^{N} a_{i,j}\right)}{N^2}.$$

The entropy coefficients are a pertinent criterion to select only the most pertinent data in the set of signature vectors of all the flights.

In particular, a sub-assembly of eigen vectors $\{a_m\}_{m=\{1, \ldots, N\}}$ is selected E45 such that the sum of the corresponding entropies $\gamma_m$ is greater than the percentage of the sum of the N entropies $\gamma_i$.

In a preferred manner, the percentage is comprised between 75 and 95%, preferably 90%.

The selection of this sub-assembly makes it possible to define a zone of normal flights E going back to the parameters of each vector $X_i$ associated with the selected eigen vectors.

In relation with FIG. 2, if a simple example is considered with two parameters, it is then possible to represent all the flights in a two dimensional graph and it is then possible to determine the zone of normal flights E as being the circle surrounding the cluster of data.

Then, for each flight i, an abnormality score $z_i$ is determined E5, defined by the distance of the flight $X_i$ with respect to the zone of normal flights E.

The abnormality score is defined by $$z_i = 1 - \sum_{k \in m} \frac{(K_i^T a_k)^2}{\lambda_k}$$

with $a_k$ the eigen vectors selected and $\lambda_k$ their associated eigen values.

The abnormality score is comprised between 0 and 1. The closer the score is to 1, the more the flight is considered abnormal.

With reference to FIG. 2, the flights far from the zone of normal flights E have "abnormal" scores.

In a preferred manner, it is considered that the flights i for which the abnormality score is greater than 0.99 are very probably abnormal and the flights i for which the score is greater than 0.999 are very decidedly abnormal.

Consequently, one detects E6, as a function of the abnormality score $z_i$, if at least one flight is abnormal.

The abnormality score may be displayed to be viewed by an analyst.

As will have been understood, to determine whether a flight is abnormal, the method uses all the data at its disposal to, itself, determine in what manner a flight may be considered normal and thereby determine which are not. Thus, it is not necessary to put in place detection rules.

If an abnormal flight is detected, for the latter a nominal reference flight known as "phantom flight" the nearest to this abnormal flight detected is determined E7 while being in the zone of normal flights, the phantom flight being able to be different to a signature flight $X_i$.

In other words, the phantom flight is defined as the theoretical flight the nearest to the abnormal flight detected while being in the zone of normal flights.

It is in particular the signature $Z_0$ of the phantom flight that is going to be determined.

The phantom flight has a score z less than 0.99 (or 0.95 if it is really wished to ensure the normality of this flight).

The phantom flight is thus the projection of the abnormal flight detected in the zone of normal flights. In particular, it is the nearest projection.

The phantom flight is generated during the method, it is potentially independent of the flights analysed.

The phantom flight of signature $Z_0$ associated with an abnormal flight detected of signature $X_i$ is generated via a constrained non linear optimisation procedure. This optimisation procedure, for a fixed threshold value seuil, is expressed in the following manner:

$$Z_0 = \underset{z(Z) < seuil}{\mathrm{argmin}} \|X_i - Z\|_1.$$

It should be noted that the norm 1 above makes it possible to ensure that the minimum of components are changed between the abnormal flight and its phantom flight.

This optimisation procedure necessitates the calculation of the score z(Z) to obtain the signature $Z_0$ of the phantom flight.

To do this, the following vector is defined as $k_Z$, valid for all $Z \in \mathfrak{R}^d$:

$$k_Z = \begin{bmatrix} \exp\left(-\frac{\|Z - X_1\|^2}{2\sigma^2}\right) \\ \vdots \\ \exp\left(-\frac{\|Z - X_N\|^2}{2\sigma^2}\right) \end{bmatrix}.$$

Thus, the function z giving the score of any vector of $\mathfrak{R}^d$ is defined by:

$$z(Z) = 1 - \sum_{k=1}^{m} \frac{(k_Z^T a_k)^2}{\lambda_k}.$$

with $a_1, \ldots, a_m$ the m eigen vectors retained previously (covering 90% of the total entropy) and $\lambda_1, \ldots, \lambda_m$ their associated eigen values.

In relation with FIG. 2, if the flight corresponding to the parameters referenced 20 is abnormal, the corresponding phantom flight is the flight for which the parameters are referenced 20'.

This makes it possible to compare E8 the parameters of the abnormal flight detected with those of the phantom flight determined in order to detect at least one parameter of the abnormal flight that has rendered abnormal said abnormal flight detected.

The invention claimed is:

1. Method of analysing flight data comprising the following steps:
    obtaining flight data recorded during N flights of at least one aircraft, said flight data have been recorded with a flight data recorder of an aircraft;
    grouping in a signature vector $X_i$ of a flight i, the data corresponding to the flight i said signature vector $X_i$ being of size d, the components of the signature vector being the data recorded during said flight i;
    obtaining a zone of normal flights and classifying the flight signatures $X_i$ with respect to their distance to said zone, using a Gaussian kernel entropy component analysis of the flight signatures $X_i$;
    determining, for each flight i, an abnormality score $z_i$ defined by the distance of a flight signature $X_i$ with respect to the zone of normal flights;
    detecting, as a function of the abnormality score $z_i$, at least one abnormal flight;
    determining for each abnormal flight, a phantom flight the nearest to the abnormal flight while being in the zone of normal flights,
    wherein the Gaussian kernel entropy component analysis comprises the following sub-steps:
    determination of a matrix of similarity K of size N×N, the components of which quantify the proximity between two flight signatures $X_i$;
    breakdown into eigen vectors of the matrix of similarity K to obtain N eigen vectors $a_1, \ldots, a_N$ and N eigen values $\lambda 1, \ldots, \lambda_N$ such that $\forall i=1, \ldots, N \; K \cdot a_i = \lambda_i \cdot a_i$;
    determination for each eigen vector of its entropy coefficient $\gamma_i$;

selection of a sub-assembly of eigen vectors $\{a_m\}_{m \in \{1, \ldots, N\}}$ such that the sum of the entropies $\gamma_m$ is greater than the percentage of the sum of the N entropies $\gamma_i$.

2. The analysis method according to claim 1, in which the parameters of the abnormal flight detected are compared with those of the phantom flight determined in order to detect at least one parameter of the abnormal flight which has rendered abnormal said abnormal flight detected.

3. The analysis method according to claim 1, in which the entropy coefficient is defined by:

$$\forall i = 1, \ldots, N$$
$$\gamma_i = \frac{\lambda_i \cdot \left(\sum_{j=1}^{N} a_{i,j}\right)}{N^2}.$$

4. The analysis method according to claim 1 in which the abnormality score of a flight i is defined by:

$$z_i = 1 - \sum_{k \in m} \frac{(K_i^T a_k)^2}{\lambda_k}.$$

5. The analysis method according to claim 1, in which the components of the matrix of similarity K are defined by:

$$\forall i = 1, \ldots, N$$
$$K_{i,j} = \exp\left(-\frac{\|X_i - X_j\|^2}{2\sigma^2}\right),$$

where $\sigma^2$ is a predetermined bandwidth parameter.

6. The analysis method according to claim 5, in which the bandwidth parameter $\sigma^2$ is determined in the following manner:
- a matrix D of size N×N corresponding to the distance between two flights is determined and is defined in the following manner $\forall i=1, \ldots, N$ $D_{i,j}=\|X_i-X_j\|^2$;
- each component of each column is arranged in ascending order to obtain a matrix D';
- k first lines of the matrix D' thereby obtained are selected and the others are eliminated to obtain a matrix D' of size k×N;
- the average of each column of the matrix D' to obtain N values $y_1, \ldots, y_N$ is determined;
- the median absolute deviation of the values $y_1, \ldots, y_N$ defined by $mad=mediane\{|y_i-med|\}$ with $med=mediane\{y1, \ldots, y_N\}$ is determined;
- the bandwidth parameter $\sigma^2$ is determined from the median absolute deviation of the values $y_1, \ldots, y_N$ by the following functional $$\sigma^2 = \max_{y_i < med + 20 \cdot mad} \{y_i\}.$$

7. The analysis method according to claim 1, in which the data of a flight i are grouped together in a matrix $F_i$ of dimension T×P with T the number of data recorded during the flight i and P the number of parameters recorded, the vector $X_i$ having for components the columns of the matrix $F_i$ end to end, the vector $X_i$ being then of dimension d=T×P and is defined by $$X_i = [F_i(t=1,p=1), \ldots, F_i(t=1,p=P), \ldots, F_i(t=T, p=P)].$$

8. The analysis method according to claim 1, in which the data of a flight i are grouped together in a matrix $F_i$ of dimension T×P with T the number of data recorded during the flight i and P the number of parameters recorded, the vector $X_i$ having for components the columns of the matrix $F_i$ sampled to select n<T recordings $t_1^i, \ldots, t_n^i$ of parameters, the vector $X_i$ being then of dimension d=n×P and is defined by $$X_i = [F_i(t=t_1^i,p=1), \ldots, F_i(t=t_n^i,p=1), \ldots, F_i(t=t_1^i, p=P), \ldots, F_i(t=t_n^i,p=P)].$$

9. The analysis method according to claim 1, in which the data of a flight i are grouped together in a matrix $F_i$ of dimension T×P with T the number of data recorded during the flight i and P the number of parameters recorded, the vector $X_i$ having for components the average, the variance, the minimal value, the maximal value of a parameter among all the recordings of this parameter, the vector $X_i$ being then defined by:

$$X_i = \begin{bmatrix} \text{mean}(F_i(p=1)), \text{var}(F_i(p=1)), \text{max}(F_i(p=1)), \text{max}(F_i(p=1)), \\ \vdots \\ \text{mean}(F_i(p=P)), \text{var}(F_i(p=P)), \text{max}(F_i(p=P)), \text{max}(F_i(p=P)) \end{bmatrix}.$$

\* \* \* \* \*